May 16, 1950  R. S. DAVIES  2,508,328
ELECTRICAL PERCENTAGE CONTROL APPARATUS
Filed May 11, 1945
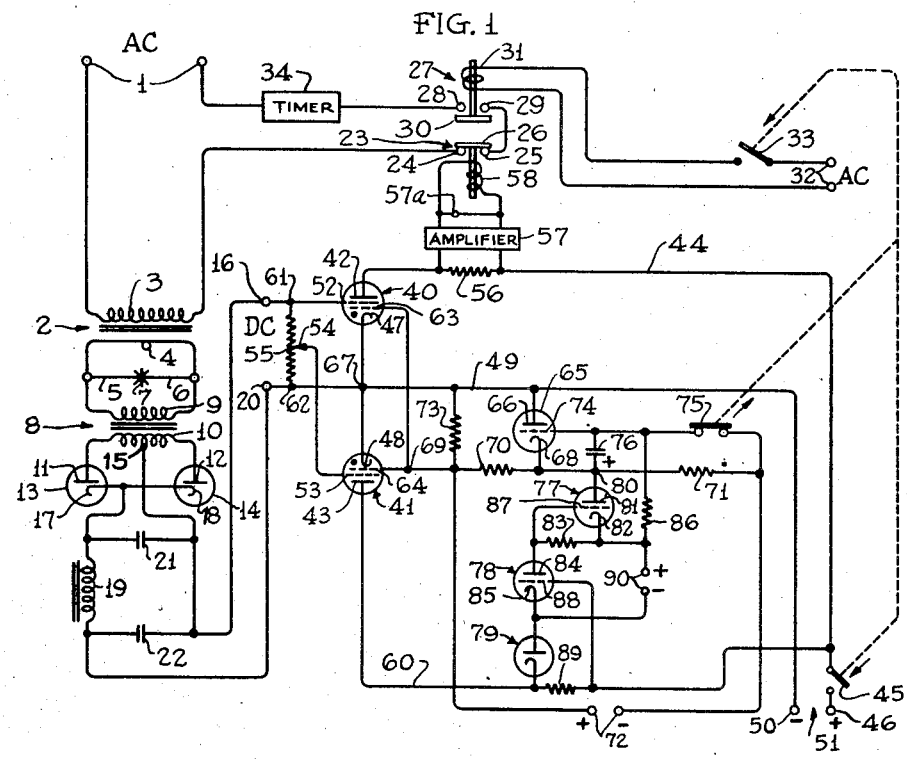
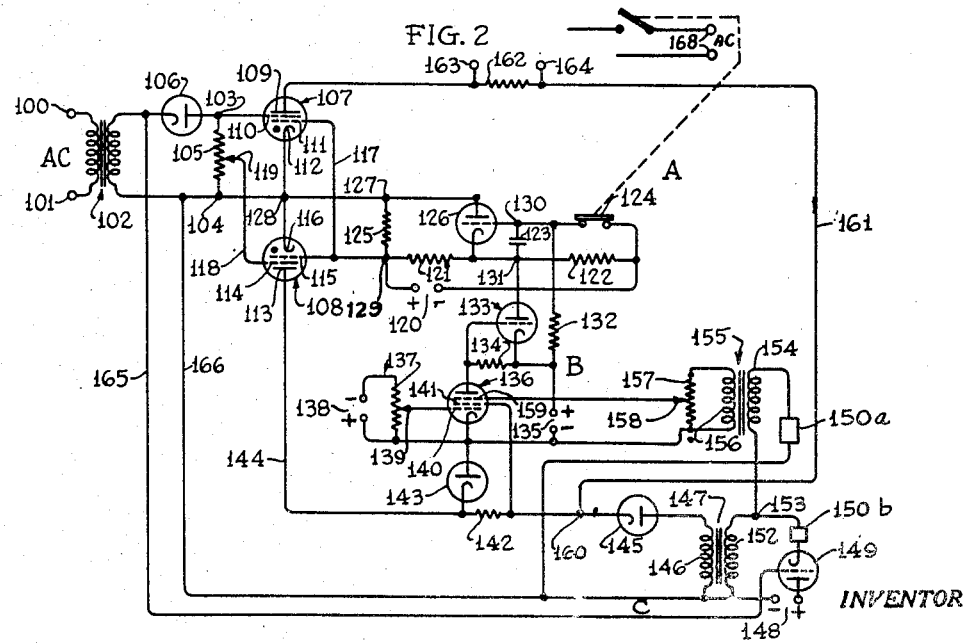
INVENTOR
RICHARD STILLMAN DAVIES
BY John R. Tarbox
A. TORNEY Patented May 16, 1950

2,508,328

UNITED STATES PATENT OFFICE 2,508,328

ELECTRICAL PERCENTAGE CONTROL APPARATUS

Richard Stillman Davies, Philadelphia, Pa., assignor to The Budd Company, Philadelphia, Pa., a corporation of Pennsylvania Application May 11, 1945, Serial No. 593,171

7 Claims. (Cl. 175—320)

This invention relates to percentage indicating and lock-out electrical circuits.

In my application, Serial No. 529,621, filed April 5, 1944, now Patent No. 2,472,042, of which the present application is a continuation-in-part, I describe a circuit with associated apparatus for actuating indicating or lock-out means in a power circuit after a predetermined percentage drop of power in that circuit. In accordance with said application, use was made of relay means directly associated with gas tetrodes for causing both the setting of the percentage point and the direct energization of the control or indicating apparatus. While such an arrangement is useful in many setups, nevertheless under certain conditions it is desirable that the speed of actuation be more rapid than is usually attainable with a mechanical relay. Also, certain improvements in the circuits have been found possible.

Accordingly, it is an important object of the present invention to provide a circuit arrangement for actuating percentage indicating and lock-out means which is dependent primarily in the places where the time factor may be critical, upon direct operation through electronic units. Another object of the invention is to provide percentage indicating and lock-out means which will function on direct application to alternating current power supply without the interposition of complete rectification between the control and the power circuit. An object also is to prevent capacitor leakage during static stages of circuit operation. An object additionally is to provide circuit means for coordinating capacitor discharge cyclic intermittent flow in a related circuit. Other objects will appear on consideration of the following description of the invention, as applied to the form of the invention shown in the accompanying drawings in which:

Figure 1 is a view of the circuit as applied to a fully rectified current source; and Figure 2 is a view of the modified circuit as utilized in connection with an alternating or partially rectified current source.

Referring to Figure 1 of the drawing, the numeral 1 indicates a source of alternating current which is led through the transformer 2 having a primary coil 3 and a secondary coil 4 to the electrodes 5 and 6 of a resistance welder, the workpiece between electrodes being indicated by the numeral 7. The electrodes 5 and 6 have connection to a transformer 8 through a primary coil 9 the transformer having a secondary coil 10. The terminals of the secondary 10 are connected to the anodes 11 and 12 of current rectifying tubes 13 and 14. Also the midpoint 15 of the secondary is connected to one terminal 16 of the control circuit; and the two cathodes 17 and 18 of the rectifier tubes are connected through a choke coil 19 to the other terminal 20 of the control circuit. Capacitors 21 and 22 bridge the circuit on either side of the choke coil 19, the choke coil and capacitors together forming a filter to smooth the rectified current.

The welding circuit in addition to the welding transformer 2 includes also the primary circuit control relay 23 having contacts 24 and 25 and contact plate or switch 26 and also the initiating relay 27 having contacts 28, 29 and contact plate or switch 30, this latter switch being operated by the relay coil 31 connected to a source 32 of alternating current through the initiating switch 33 which directly or indirectly is subject to manual control as is common practice. Both of these relay switches 26 and 30 are connected in series with the main power source through a timer 34, the function of the timer being to permit a fixed timing of the full length of power application in the welding relay circuit as determined by the operator. Since the timer is under the control of the operator, it may serve any desired purpose. When the percentage-voltage control apparatus is used for furnishing an indication only, the time-controlled timer 34 acts as a lock-out means. When the percentage-voltage control means operates as a lock-out for the circuit, the timer 34 is employed only as a safety device, being set for a time period normally in excess of the percentage-voltage control lock-out time period so that should the percentage-voltage control means fail for any reason, then lock-out would be established by the timer 34. It is pointed out that the illustration of the relay switches and timer in connection with the welding transformer 2 is merely diagrammatic, since the circuit of the welding primary is controlled by apparatus usually included in the timer itself, such as means for breaking the circuit of the control elements of inversely connected thyratron-controlled ignitrons usually included in the primary circuit.

Proceeding with the description of the percentage control means, there are shown two gas tetrodes 40 and 41, the anodes 42 and 43 respectively of which are connected through conductors 44 and 60 respectively and a manual switch 45 to the positive terminal 46 of a source of direct current. The cathodes 47 and 48 of tubes 40 and 41 are joined together and to a conductor 49 connecting the cathodes to the negative terminal 50 of the source 51. The screen grid 52 of tube 40 is connected to the negative electrode voltage terminal 16 and the screen grid 53 of tube 40 is connected to a terminal 54 movable in contact with a resistor 55 of uniform resistance per unit length bridging the main terminals 16 and 20. This resistor is the percentage resistor of the circuit and it is apparent that for any given value of resistance of the resistor the point of contact of the slider 54 will measure percent dependent upon its positional point of contact.

The anode circuit, including conductor 44 of the tetrode 40, is the direct current actuating circuit of the control, there being included in this circuit a resistor 56, a potential drop occurring in the same when current is flowing in the conductor 44 which is sufficient to operate amplifying means as indicated by the box 57, and thereby the relay coil 58 of the relay 23. Energization of this coil causes an opening of the switch 26 of this relay from its normally closed position. The amplifier 57 may be of any desired construction suitable for direct current amplification, and since these circuits are well known, no details of the amplifying means need be disclosed. An indicator lamp 57a may bridge the amplifier terminals to indicate when the amplifier is operating.

The anode circuit of tube 41 including the conductor 60 connected to the positive terminal 46 of source 51 is intended to provide means, in conjunction with related apparatus, for fixing the percentage point for any given initial voltage at terminal points 61 and 62 of the percentage resistor 55. To accomplish this function, the control grids 63 and 64 of tetrodes 40 and 41 are connected together at point 69 and thence through a resistor 70 to the cathode 68 of a triode vacuum tube 65, the anode 66 of the tube having connection to resistor terminal point 62 and also to point 67 in a conductor connecting the tetrode cathodes 47 and 48. A resistor 71 is connected to the cathode 68 of tube 65 on the side opposite the resistor 70. Two leads from a direct current source 72 connect with the ends of the resistors 70, 71 distant from their connection with the cathode 68, the resistors 70 and 71 thus forming a voltage divider in the circuit from the direct current source 72. A resistor 73, connected at one end at a point between the resistor 70 and point 69 and connected at the other end to the conductor 49, is also provided.

Control of current flow through tube 65 is by means of its control grid 74 which is part of a circuit including a manual switch 75 connected to the negative terminal of source 72 and a capacitor 76 connected between the control grid 74 and the cathode 68 of tube 65. There is also provided triode vacuum tubes 77 and 78 and the rectifier tube 79, these three devices being substantially in series between the capacitor 76 and the cathode 68 of tube 65 on the one side and the conductor 60 of the circuit of tetrode tube 41 on the other. Point 80, forming the positive charging terminal of the capacitor 76, is connected by a lead to the anode 81 of tube 77, the cathode 82 having connection through a resistor 83 to the anode 84 of tube 78 and the cathode 85 of this latter tube being connected through the rectifier tube 79 to the conductor 60. The cathode 82 of tube 77 is also connected through a resistor 86 to the negative side of the capacitor 76 at a point between the switch 75 and the grid 74 of tube 65. The grid 87 of tube 77 is connected directly to the anode 84 of tube 78 and the grid 88 of tube 78 is connected to conductor 60. A resistor 89 is interposed in the conductor 60 between the control grid 88 and the cathode of rectifier 79 in the conductor 60. Also an auxiliary source of direct current 90 is connected to the anode and cathode of tube 78, the positive terminal having connection to the anode through resistor 83 and the negative terminal directly to the cathode.

The operation of the circuit of Figure 1 will now be described as applied to a conventional resistance welder. In the copending application of Herbert VanSciver, Serial No. 524,243, filed February 28, 1944, now Patent No. 2,433,967, for "Method of weld control" and assigned to the same assignee as this application, it is pointed out that when a workpiece, such as 7 of Figure 1, consisting of two overlapping metal plates interposed between the electrodes, is subjected to a heating current, on fusion the resistance of the workpiece drops with an accompanying drop in voltage which may be as much as 25% of the voltage prior to fusion. Accordingly, it is apparent that if the control circuit is so devised as to utilize a predetermined percentage drop across the electrodes for actuating indicating or lockout mechanism it would be possible to utilize the mechanism successfully for any variation of applied voltage to the welding electrode terminals and to maintain the point of operation indefinitely at a fixed point. If the percentage control be set for operation on the drop of 25% from the applied voltage at the electrodes then the lockout or indicating means would function at this percentage irrespective of any changes of the circuit values. To accomplish this result, it is necessary to set up a device for selecting the desired percentage value, and this is accomplished by the resistor 55 in conjunction with the slider 54. In addition, it is necessary that the circuit fix the percentage point irrespective of any change in the source voltage but dependent only upon the voltage as applied initially to the resistor terminals. The circuit for accomplishing fixing of the percentage value is that including the conductor 60 and tetrode 41.

After fixing the percentage value, it is necessary to provide an auxiliary circuit. On change of the amount of applied voltage from its initial value to that of the fixed percentage value, energization will occur in a circuit which when amplified will cause signal indicating or lockout mechanism to function. This is accomplished by the circuit including the tetrode 40 with its associated conductor 44 and other included elements.

It is observed in the first place that the manual switches 33, 75 and 45 are interconnected or ganged and simultaneously operable to bring about the functioning of the apparatus and circuit. Switch 75 is normally closed and source 72 is, prior to the initiation of a welding cycle, supplying current which passes through the voltage divider 70, 71 and through the capacitor 76 and switch 75 so that the capacitor 76 is charged to the full value of the drop across resistor 71. At the same time, current from this source passes through the resistor 73 and tube 65 to a limited amount, the current through this circuit being reduced by the negative condition of the bias on the grid 74 of the tube. Also current will be passed through the tube 78 from source 90 due to the fact that the grid 88 has no charge.

On manipulation of the ganged switches 33, 75 and 45, the closure of initiating switch 33 operates relay 27, closing switch 30 and causing current to flow through the welding transformer 2 and electrodes 5 and 6. This will cause the flow of full wave rectified or substantially direct current transmitted from the rectifying tubes and filter arrangement to points 61 and 62 of the percentage resistor; and, for the voltage at these points, the point 54 establishes a definite percentage voltage value. At the same time, the closure of gang switch 45 results in the application of a positive potential from source 51 on the anodes of tetrodes 40 and 41. No current passes through these tubes since the flow of current is dependent upon the proper degree of bias of both control and screen grids and it is apparent that while the screen grid 53 of tube 41 is at the percentage value, the screen grid 52 of tube 40 is substantially below this value. It is also apparent that since the control grids 63 and 64 of the tetrodes are connected together, the tube 41 will function and conduct current only when the bias on the control grid has been lifted to such value as, in conjuntion with the fixed value of the screen grid bias, to cause the tube to strike. Tube 40 will strike only when the bias on the screen grid 52 has been changed to the same value as at the point 54 initially. In other words, if the control grids of the two tetrodes are maintained constant at a point at which tube 41 strikes then on a reduction of the voltage between points 61 and 62 to a point equivalent to that between points 54 and 62 before the change, tube 40 will strike and the actuating mechanism will be energized.

On the closing of switches 33 and 45 and the accompanying opening of gang switch 75, capacitor 76, which has already been charged as previously described, begins to discharge through the tube 77 and resistor 86. This reduces the bias on the control grid 74 of tube 65 and increases the flow of current through this tube and thereby progressively charges the bias on the control grid 64 of the tetrode 41. This continues until the tube 41 strikes and thereupon a voltage drop is impressed across the resistor 89 to place a positive potential on grid 88 of tube 78 thereby increasing the flow of current through tube 78 and the resistor 83. This increases the bias on grid 87 of tube 77, thus arresting the discharge of current from the capacitor 76 and fixing the potential on the grid 64 of tetrode 41.

The current and voltage condition of the control circuit is now static assuming a substantially constant voltage across the percentage resistor 55 and substantially no leakage from the condenser, as is the case.

Should however the voltage across resistor 55 drop for any reason such as the completion of a weld, the voltage at point 61 with reference to point 62 rises making screen grid 52 less negative. If the degree of elevation is such as to bring the potential of grid 52 to the striking point current will flow in the tetrode 40 producing a potential drop across the resistor 56. This drop is in turn amplified by the amplifier 57 and relay coil 58 is energized opening switch 23 and thereby the primary welding circuit including the welding primary 3 thus stopping the welding action. The switch 33 may then be opened thus de-energizing the initiating relay switch 27. Switch 45 is opened and switch 75 closed at the same time and, source 120 being constantly available, capacitor 76 is again charged.

In Fig. 2 I have shown a modification of the invention wherein points 100 and 101, corresponding to points 16 and 20 in Fig. 1, are directly connected to an alternating current source which may be associated with the secondary of a welding circuit. In this modification the alternating current at terminals 100 and 101 is preferably amplified by transformer 102 and the transformed current led to the terminals 103 and 104 of the percentage resistor 105, there being connected between point 103 and the transformer secondary, a half-wave rectifying tube 106. The positive anode of the rectifying tube is connected to the point 103. Also connected to the points 103 and 104 of the resistor are the gas tetrodes 107 and 108 corresponding to the tubes 40 and 41 of Fig. 1. Tube 107 includes the anode 109, screen grid 110, control grid 111, and cathode 112, and tetrode 108 includes the anode 113, screen grid 114, control grid 115 and the cathode 116. Connection of point 103 of the resistor is to the tube grid 110, and connection of the point 104 is to both cathodes 112 and 116 of the tubes. The control grids of the tubes are interconnected by the conductor 117. The screen grid 114 of tube 108 is connected by conductor 118 to the movable contact 119 engaging the resistor 105 whereby variation in the potential of the grid may be secured.

As in Fig. 1, there is employed a branch circuit indicated by the letter A including a source 120 of direct current adapted to pass current through a voltage divider including the resistors 121 and 122, with the capacitor 123, together with the manual normally closed gang switch 124, in parallel with the resistor 122. By this means the capacitor 123 is made to assume a charge at a voltage equal to the voltage drop of the resistor 122. In parallel with the resistor 121 of the voltage divider circuit is a second resistor 125 and a vacuum triode tube 126, the anode of the tube having connection to the resistor 125 at a point 127 and the cathode of the tube having connection to the voltage divider intermediate resistor 121 and 122. The control grid of tube 126 is connected directly to the capacitor 123 and manual switch 124. Also point 127 of the resistor 125 is directly connected to point 128 in the conductor joining the tetrode cathodes and beyond that to point 104 of the resistor 105. Also point 129 of resistor 125 is connected to the conductor 117 joining the tetrode control grids.

The branch circuit generally indicated by B is intended to provide means for initiating the current flow through the tetrode 108 and to fix the value of the current flow as established, this action being in conjunction with the capacitor 123 with its auxiliary circuit elements. The two opposite terminals 130 and 131 of capacitor 123 are connected in the circuit including the resistor 132 and the triode vacuum tube 133, the anode of the tube being connected to the point 131 and the cathode to the resistor 132. The cathode of the tube 133 is connected through a biasing resistor 134 to the control grid of the tube. A biasing current is supplied for the grid of tube 133 from a source 135 of direct current, the biasing circuit including the source, the resistor 134, and a tube 136 having the anode thereof directly connected to a point between the resistor and the grid of tube 133, and the cathode thereof to the source 135.

Also, for the tube 136 a control grid 140 is provided with a source of biasing potential, in this case the means comprising a variable resistor 137 supplied by a source of direct current 138, with the slidable contact 139 of the resistor directly connected to the control grid 140 of tube 136. Further biasing control of tube 136 is provided by a second or screen grid 141 which is connected to a biasing resistor 142 and a rectifying tube 143 having the anode thereof connected directly to the cathode of tube 136 and the cathode connected to the low potential side of resistor 142.

The resistor 142 on the low potential side is connected by conductor 144 to the anode 113 of the gas tetrode 108 and on the high potential side to the cathode of a rectifier 145 having the anode thereof connected through the secondary 146 of a transformer 147 to the negative terminal of a source of direct current 148. The positive terminal of the source 148 is also connected through the tube 149 and phase change unit 150b to the primary 152 of transformer 147 and thence to the negative terminal source 148. The positive inside end of the transformer primary 152 at point 153 is connected also to the primary 154 of a transformer 155 having a secondary 156. This secondary 156 forms part of a circuit including a voltage divider resistor 157, the variable contact 158 thereof being connected directly to the shield grid 159 of tube 136. At a point 160 between the negative terminal of rectifier 145 and the resistor 142, connection is made to the anode 109 of the tetrode 107 by means of conductor 161. In this circuit is included the resistor 162 having terminal connections 163 and 164 through which connection is made to the amplifier 57 and circuit breaking mechanism in the power supplying circuit similar to the showing of Fig. 1 of the drawing.

The grid of tube 149 is directly connected by the conductor 165 to the end of the secondary of transformer 102 having connection to the rectifier 106. A return conductor 166 from the opposite side of this secondary connects directly to the negative terminal of the source 148. The manual switch 124 in the capacitor circuit is connected for operation with an initiating switch 167 in a starting circuit including a power source 168 applicable through the welding circuits to the primary circuit of transformer 102. Switch 167 of Fig. 2 corresponds to switch 33 of Fig. 1. The branch circuit, including the rectifier 145, transformer 147, source 148, triode 149 and phase change unit 150b, is designated by the letter C.

The operation of this modification of the invention is as follows. It may be assumed first that the initiating switch 167 is open and the circuit 100—101 is de-energized and that power is being supplied the circuit from direct current source 120 in branch A and sources 135, 138 and 148 in branch B. As a result capacitor 123 in the A branch assumes the voltage drop of resistor 122 from source 120 since switch 124 is closed. Also the potential on control grid 140 of tube 136 is adjusted so as to bring the grid voltage to the cut-off point thereby through effect on the grid of tube 136 preventing current flow in tube 133 and leakage from capacitor 123. At the same time voltage from source 148 passes current through the primary of transformer 155 but no transformation results due to the direct nature of the current.

If power is now applied to terminals 100—101 through closure of switch 167 there results an impressment of half-cycle current pulses on the percentage resistor 105, the corresponding voltages of the screen grids 110 and 114 of tubes 107 and 108, resulting from this current flow, being divergent by the amount of voltage drop as determined by the position of the resistor slide 119.

At the same time the alternating current is impressed on the grid of tube 149 in the C branch thereby developing an intermittent current which is transformed into an alternating current in transformers 147 and 155. An alternating voltage is thereby impressed upon the grid 159 of tube 136 and an intermittent positive voltage on the anode 113 of tube 108.

Since alternate half-cycles are effective at the grids 110, 114 of the tetrodes 107 and 108, it is desirable that the striking point in these tubes as developed by the capacitor 123 in the A circuit occur during these active half-cycles to secure accuracy in the operation. This is accomplished by the grids 159 and 141 of tube 136.

It will be apparent that since slider 139 of grid 140 is adjusted to place the grid 140 of tube 136 at the cut-off point, on a negative alternation of the voltage in grid 159 some current will flow through the tube 136 and the voltage of the grid of tube 133 will become more positive permitting current to flow from the capacitor 123 when the switch 124 is opened. On the positive half-cycle of grid 159 this discharge ceases. Hence if the phase of voltage on grid 159 is 180° displaced from that of the screen grid voltages of the tetrodes, tube 108 will strike only during discharge from the capacitor 123.

If the initiating switch 167 is now closed and the gang switch 124 is opened, capacitor 123 in the A branch begins to discharge cyclically through tube 133. As the voltage across the capacitor decreases the grid of tube 126 becomes more positive increasing the current flow through resistor 125 and raising the bias of the control grids of tubes 107 and 108 until tube 108 strikes. Thereupon current flows through this tube 108 bringing a voltage drop across resistor 142 in conductor 144 and applying an intermittent voltage to grid 141, 180° out of phase with the voltage on grid 159, neutralizing the same. Thereupon the bias of the grid in tube 133 falls to the cut-off point thereby stopping the flow of current from the capacitor 123. A static condition then exists in the circuit of tetrode tube 108, assuming an average constant voltage across both terminals 100—101.

In event that the voltage across 100—101 drops as in the case of weld completion in a welding circuit, the bias on the screen grid 110 of tube 107 is reduced; and, if this bias reduction is sufficient, tube 107 strikes and a voltage drop appears across resistor 162 which if amplified by the connected circuit as shown in Fig. 1 may be utilized for indicating the voltage drop in the supply circuit or for interrupting this circuit as by use of a disconnecting relay in the supply circuit. The particular utility of the modification as shown in Fig. 2 is to reduce the time factor by elimination of part of the transformation apparatus.

Modifications other than hereinabove described may be made and interchanges and substitutions carried out which form known usage among engineers and technicians in this field and hence no limitation is implied by the specific circuits illustrated and described other than that which may be required by the claims hereto appended.

What is claimed is:

1. In an electric control system for an alternating current electrical power unit subject to voltage change, circuit means adapted for connection to the power unit for establishing a fixed reference percentage voltage value of the power unit voltage, said circuit means comprising a rectifier, a resistor connected to said power unit through said rectifier, a movable element engaging said resistor for functioning as a voltage divider, a capacitor, a circuit connected between said resistor and capacitor subject to intermittent voltage pulses from the power unit through the rectifier, means for charging said capacitor, means for fixing the charge of the capacitor at a predetermined value dependent on the initial voltage of the power unit, said charge-fixing means including means for discharging said capacitor only during said voltage pulses on said circuit, and control means jointly responsive to the subsequent changed voltage of the power unit and a potential established thereon as a standard reference value from the initial power unit voltage for providing a control impulse.

2. In an electric control system for an alternating current electrical power unit subject to voltage change, a conductor connected to said power unit, circuit means adapted for connection to the power unit for establishing a fixed reference percentage voltage value of the power unit voltage, and control means connected to said circuit means and operative at a change of the unit voltage with reference to said fixed percentage voltage to alter the energization of said conductor, said circuit means comprising a rectifier, a resistor connected to said power unit through said rectifier, a movable element engaging said resistor for functioning as a voltage divider, a capacitor, a circuit connected between said resistor and said capacitor subject to intermittent voltage pulses from the power unit through the rectifier, means for charging said capacitor, means for fixing the charge of the capcitor at a predetermined value dependent on the initial voltage of the power unit, said charge-fixing means including means for discharging said capacitor only during said voltage pulses on said circuit, and means jointly responsive to the subsequent changed voltage of the power unit and a potential established thereon as a standard reference value from the initial power unit voltage for providing a control impulse.

3. In an electric control system for an electrical power unit subject to voltage change during a given operation, a control circuit connected to said power unit, electronic comparator means connected in said control circuit, said comparator means having a first part responsive to a percentage of full voltage and a second part responsive to full voltage, means including an initially charged capacitor and discharge means therefor for causing current to flow in said first electronic comparator part when the capacitor is discharged to a point corresponding to the percentage voltage level prior to change, means including an electronic tube which is controlled by current flow in said first comparator part for halting the discharge of said capacitor and thereby fixing its charge at a given level corresponding to said percentage voltage level, and voltage biasing means between said capacitor and said second comparator part for causing current to flow in said second comparator part when the full voltage thereon reaches a predetermined relationship with respect to the voltage exerted thereon from said capacitor.

4. In an electric control system for an electrical power unit subject to voltage change during a given operation, a control circuit connected to said power unit, a voltage drop resistor connected across said circuit and an adjustable percentage voltage drop or voltage divider device connected with said resistor, electronic comparator means in said circuit including a first comparator part responsive to percentage voltage drop as controlled by said adjustable device and a second comparator part responsive to full voltage drop, a capacitor in said circuit having biasing connections to both of said comparator parts, means to give said capacitor an initial charge sufficient to prevent flow of current in said first comparator part, means including an electronic tube which passes current in accordance with the charge on said capacitor and which exerts a hold-off-opposing bias on said comparator parts, means for cutting off said capacitor from its charging means at the start of an operation, means including an electronic tube for discharging said capacitor at the beginning of an operation and thereby increasing the hold-off-opposing bias until current flows in said first comparator part, means including an electronic tube which is actuated by current flow in said first comparator part for halting the discharge of said capacitor and thereby fixing its charge at a given level, said voltage hold-off-opposing biasing means between said capacitor and said second comparator part causing current to flow in said second comparator part when the full voltage hold-off bias thereon drops to that exerted by the capacitor with its fixed charge.

5. A control system as set forth in claim 3 which further includes means responsive to current flow in said second comparator part for controlling the operation of said power unit.

6. In an electric control system for an electrical power unit subject to voltage change, circuit means adapted for connection to the power unit for selectively establishing a fixed reference percentage voltage value of the power unit voltage, said circuit means comprising a linear resistor connected to said power unit, a movable element engaging said resistor for functioning as a voltage divider, a capacitor, an electronic device connected between and subject to the conjoint opposing bias of said movable element and capacitor and subject to current flow therethrough when the bias voltage produced by said capacitor equals that produced from said movable element, an electric power source for said device, means for charging said capacitor, means for discharging said capacitor to a point required to initiate current flow in said device, and means including an electronic tube for arresting the discharge of said capacitor when a current flows in said device, whereby current flow through the device is made to continue and the charge on said capacitor is kept constant, and control means, including a second electronic device jointly responsive to voltage bias from said capacitor resulting from flow of current in said first device and to full voltage at the power unit for providing a control impulse upon a change of full voltage to a given value relative to the percentage voltage.

7. In an electric control system for welding equipment or similar electric power units subject to voltage change in use, circuit means adapted for connection to the power unit for establishing a full voltage and a selectable fixed reference percentage voltage value of the power unit voltage, said circuit means comprising a linear resistor connected to said power unit, a movable element engaging said resistor for functioning as a voltage divider, a capacitor, a first electronic device having grids connected respectively to said movable element and to means responsive to the charge on said capacitor, an electric power source for said first electronic device, means for charging said capacitor, means including a first thermionic tube having a grid for discharging said capacitor to initiate current flow in said first electronic device, means including a second thermionic tube responsive in action to current flow in said first electronic device for arresting the discharge of said capacitor after current flows through the first electronic device for fixing at a constant value the charge on said capacitor, a second electronic device having a grid connected to means responsive to the charge on said capacitor for establishing a fixed bias on said second electronic device as a percentage of the initial voltage from the power unit, and a second grid for said second electronic device connected to said power unit across the full resistor for biasing the second electronic device to produce flow of current in said second electronic device when the voltage from the power unit changes to a predetermined value different from the initial value and corresponding to said percentage voltage value.

RICHARD STILLMAN DAVIES.

REFERENCES CITED

The following references are of record in the file of this patent:

UNITED STATES PATENTS

| Number | Name | Date |
|---|---|---|
| 1,854,965 | Traver | Apr. 19, 1932 |
| 1,931,069 | Fitzgerald | Oct. 17, 1933 |
| 1,959,690 | Roth | May 22, 1934 |
| 1,967,850 | Wideroe | July 24, 1934 |
| 2,169,851 | Romnes | Aug. 15, 1939 |
| 2,306,593 | Collom | Dec. 29, 1942 |
| 2,400,259 | Place | May 14, 1946 |

FOREIGN PATENTS

| Number | Country | Date |
|---|---|---|
| 113,839 | Australia | Sept. 10, 1941 |